Patented May 14, 1946

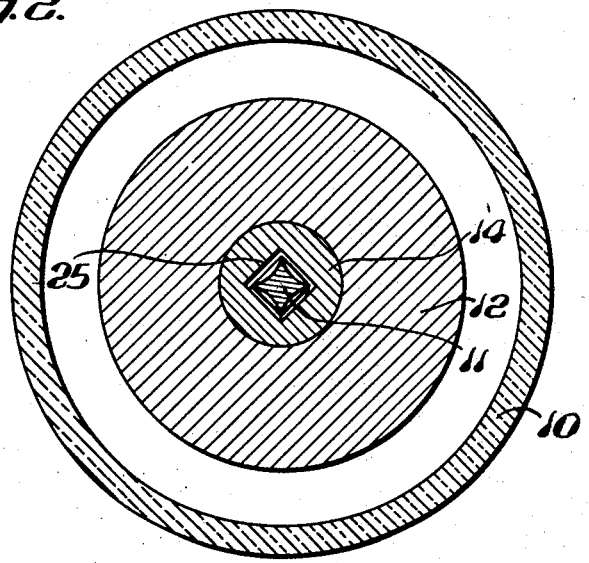
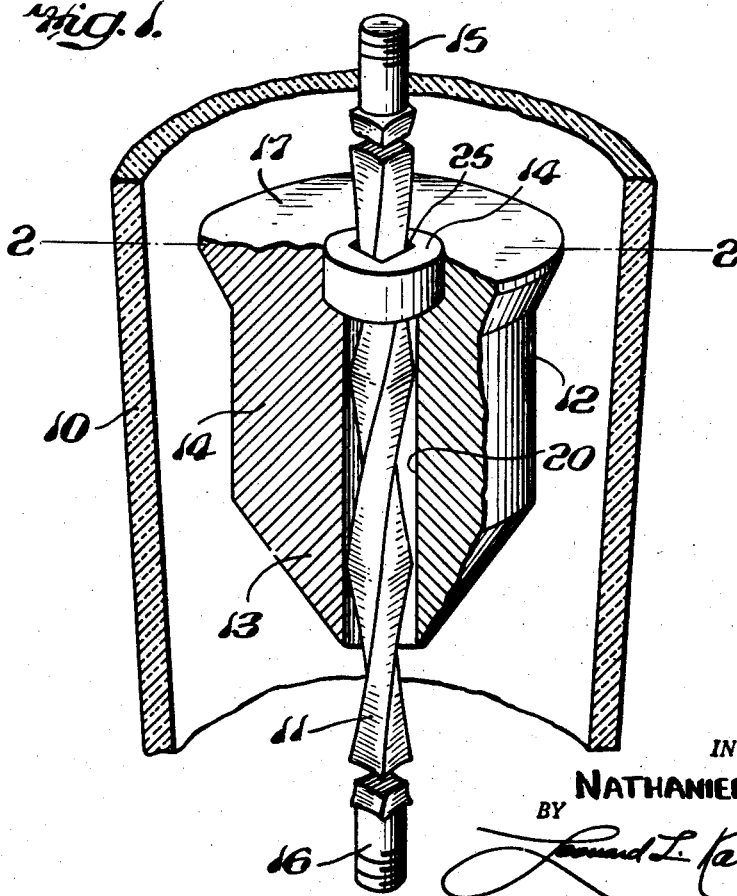

2,400,097

UNITED STATES PATENT OFFICE 2,400,097

FLOWMETER

Nathaniel Brewer, Newtown, Pa., assignor to Fischer & Porter Company, Hatboro, Pa., a corporation of Pennsylvania Application April 18, 1944, Serial No. 531,541

10 Claims. (Cl. 73—209)

The present invention relates to certain new and useful constructions and improvements in variable-area rate of flow meters of the tube and float type which are generally referred to in the trade as "rotameters."

These rotameters are used for accurately measuring the rate of flow of various fluids, and commonly comprise an upright tapered transparent metering tube, with its narrower portion lowermost, and having a free float-member therein adapted to be lifted and suspended in the space inside the tube by the vertically upward flow of fluid through said tube, with the height reached by the float-member indicating concurrent rate of flow. As the float-member rises, the cross-sectional area of the annular fluid-constricting passageway or gap between the float-member and the inside tapered wall of the tube increases, until the float-member comes to rest at some vertical position determined by the rate of flow of said fluid. The vertical position or height of the float-member, can then be readily observed from juxtaposed or adjacent scale markings, either directly on the transparent tube or elsewhere, and accurately indicates the concurrent rate of flow of said fluid.

Considerable difficulty has been hitherto encountered in using this type of meter for accurately measuring the rate of flow of compressible fluids, particularly gases at pressures lower than 50 lbs. per square inch, when the float-member is made of relatively dense material, such as the heavier metals often necessary to use in order to maintain the required flow rate indication. Any slight pulsation will frequently cause the float-member to bounce, the amplitude of oscillation building up with resonant-like regularity. Under such conditions, the float-member alternately compresses the gas on its way down building up potential pressure energy which eventually starts the float-member back up with a force sufficient to accelerate it rapidly, so that it passes its true point with considerable velocity and continues on decelerating as it expands the gas to lower than normal pressure. Then at the top of its stroke exactly the reverse action takes place and the float-member descends. This appears to be a resonant phenomenon, since by increasing the pressure on the gas beyond some point, say 50 lbs. per square inch, a pulsating float-member can move but a slight amount before compressing the gas sufficiently to reverse its action so that the amplitude of oscillation is at first reduced, and being reduced the acceleration dies out and the float-member settles down rather quickly to its true indication.

It has been customary hitherto to damp out such oscillations of the float-member by installing a hydraulic dash-pot beneath the flow meter, and to equip it with a piston having a slight clearance to permit flow of fluid from one side to the other under controlled action and attaching the piston to the float-member in the meter in order to anchor it against such oscillations.

According to the present invention, the use of such dashpot construction is eliminated with all of its inherent drawbacks, such as temperature limitations, fouling with dirt, loss of fluid by accident or by absorption in the gas being metered, and the like.

For the purpose of illustrating the invention, there is shown in the accompanying drawing a form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentality as herein shown and described.

Figure 1 is a perspective fragmental view of a flow meter, partly broken away in section, embodying the novel features of my invention, and Figure 2 is a cross-sectional view taken on lines 2—2 of Figure 1.

In the drawing the upright transparent downwardly tapered cylinder or tube is indicated by numeral 10, through which the compressible fluids, particularly gases at pressures of 50 lbs. per square inch or less flow upwardly. A guide-rod 11 extends axially in the tube and serves as a means for guiding a float-member 12 thereon. The float-member 12 is formed of a cylindrical body portion 14, a downwardly tapered tail portion 13, and a tapered head portion 17, extending laterally beyond the body portion. The head portion 17 serves to regulate and restrict the effective area of the annular passageway between its outermost periphery and the tapered wall of the tube 10 upon vertical movement of the float-member within the tube 10. The float-member is provided with an axial cylindrical bore 20 extending therethrough for freely receiving thereon the guide-rod 11. The bore in the head portion of the float-member is enlarged at its upper end to receive a nut 14. The float-member is provided at its head portion with a nut 14 having a square opening 25 to fit the twisted rod 11, said nut being imbedded in the float-head 17 and secured thereto by brazing or other similar methods. Sufficient clearance is left in the square opening 25 of the nut so that the float-member 12 can move, say about 4 or 5 mm., vertically before taking up the slack, further motion then resulting in rotation. Instead of using a separate nut, the float-member may be made integrally throughout, if desired, suitably bored to proper dimensions and contour so that the axial bore 20 extends therethrough and having its upper terminal bore portion of suitable square contour to fit the guide-rod 11 so as to operate in the manner previously explained.

The guide-rod 11 is preferably made of a stainless steel or other suitable corrosion resistant metal, twisted to form a long-lead helical screw. For example, the guide-rod may be constructed of a ⅛" stainless steel rod having a square cross-section and twisted to have a pitch of 1 in. so that the float-member guided by it will make one revolution in 4 in. vertical travel of the float-member. The guide-rod 11 is threaded at its upper and lower ends 15 and 16, respectively, for secure retention in suitable fittings or heads.

The guide-rod 11 maintains the float-member in the axial center of the tube in line with the main force of the upward flow therethrough and also serves to space the float-member equidistantly from the side walls of the tapered tube. It will be obvious that vertical motion of the float-member is caused by change in rate-of-flow which results in an unbalance of forces acting vertically along the axis of the tube resulting in vertical acceleration of the float-member in response to such force. Inertia of the float-member first tends to retard this acceleration and later when terminal velocity has been reached, prevents rapid deceleration. With the construction shown, longitudinal acceleration must also be accompanied by the rotational acceleration in an amount proportional to the twist angle of the guide-rod. Inertia forces proportional to the angular acceleration produce a resistance to such acceleration thereby requiring the guide-rod to produce a twisting force equal and opposite to the torque produced by this inertia. This then causes the square nut to bear with force against the square-guide-rod and since the float-member is being accelerated along the length of the rod there is a frictional force produced by the nut in a direction along the guide-rod and opposite to the accelerating force. The more rapid the acceleration, the greater the snubbing force tending to restrict motion. This, however, is always less than the accelerating force and always proportional to it so that when the float reaches its true indicating position at which there is no longer any vertical accelerating force, there is likewise no longer any frictional force. Under these conditions, the float-member then is free to move exactly to its true position, at which the lifting force of the fluid just counterbalances the negative buoyancy of the float.

In actual use, the float-member so arranged will move to its true position so rapidly upon change in rate-of-flow as to appear to suddenly come to position and stick. Tests have proved it does not actually stick, but that the dampening effect is so marked that the float-member slides directly into its true position without any visible oscillation about this point.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent, is:

1. A fluid flow meter comprising an upright generally vertically tapered metering tube, a guide-rod extending axially upwardly through said metering tube, said guide-rod being provided with helical threads, a float-member provided with an axial bore extending therethrough for slidably receiving said guide-rod and being freely movable thereon, a nut provided within said bore and fixedly retained by said float-member, said nut being bored to fit said guide-rod and permit limited free vertical movement therealong and subsequent rotational movement upon vertical acceleration of the float-member in response to an unbalance of axially vertically acting forces in the said metering tube, whereby said float-member will assume its true position without any visible oscillation at said position.

2. A fluid flow meter comprising an upright generally vertically tapered metering tube, a guide-rod having a square cross-section extending axially upwardly through said metering tube, said guide-rod being twisted to form a long-lead helical screw, a float member provided with an axial bore for slidably receiving said guide-rod and being freely movable thereon, a nut provided within said bore and fixedly retained by said float-member, said nut having a square bore to fit said twisted guide-rod and permit limited free vertical movement therealong and subsequent rotational movement upon vertical acceleration of the float-member in response to an unbalance of axially vertically acting forces in the tube, whereby said float member will assume its true position without any visible oscillation at said position.

3. A fluid flow meter comprising an upright generally vertically tapered metering tube, a guide-rod being square in cross-section and extending axially upwardly through said metering tube, said guide-rod being provided with helical threads, a float-member provided with an axial bore extending therethrough for slidably receiving said guide-rod and being freely movable thereon, said bore being square-shaped in cross-section, a terminal bore portion thereof to fit said guide-rod and permit limited free vertical movement therealong and subsequent rotational movement upon vertical acceleration of the float-member in response to an unbalance of axially vertically acting forces in the tube, whereby said float-member will assume its true position without any visible oscillation at said position.

4. A fluid flow meter comprising an upright generally vertically tapered metering tube, a guide-rod extending axially upwardly through said metering tube, said guide-rod being provided with helical threads, a float-member provided with an axial bore extending therethrough for slidably receiving said guide-rod and being freely movable thereon, said bore being of a contour to fit said guide-rod and permit limited free vertical movement therealong and subsequent rotational movement upon vertical acceleration of the float-member in response to an unbalance of axially vertically acting forces in the tube, whereby said float-member will assume its true position without any visible oscillation at said position.

5. A fluid flow meter comprising an upright generally vertically tapered metering tube, a guide-rod having a square cross-section extending axially upwardly through said metering tube, said guide-rod being twisted to form a long-lead helical screw having a pitch of about 1 inch, a float-member provided with an axial bore for slidably receiving said guide-rod and being freely movable thereon, a nut provided within said bore and fixedly retained by said float-member, said nut being bored to fit said twisted guide-rod and permit limited free vertical movement therealong and subsequent rotational movement upon vertical acceleration of the float-member in response to an unbalance of axially vertically acting forces in the tube, whereby said float-member will assume its true position without any visible oscillation at said position.

6. A fluid flow meter comprising an upright generally vertically tapered metering tube, a guide-rod having a square cross-section extending axially upwardly through said metering tube, said guide-rod being twisted to form a long-lead helical screw, a float-member provided with an axial bore for slidably receiving said guide-rod and being freely movable thereon, a nut provided within said bore and fixedly retained by said float-member, said nut being bored to fit said twisted guide-rod and permit limited free vertical movement therealong of about 5 mm. and subsequent rotational movement upon vertical acceleration of the float-member in response to an unbalance of axially vertically acting forces in the tube, whereby said float-member assumes its true position without any visible oscillation at said position.

7. A fluid flow meter comprising an upright generally vertically tapered metering tube, a guide-rod having a square cross-section and extending axially upwardly through said metering tube, said guide-rod being twisted to form a long-lead helical screw, a float-member provided with an axial bore for slidably receiving said guide-rod and being freely movable thereon, a nut provided within said bore and fixedly retained by said float-member, said nut being bored to fit said twisted guide-rod and permit limited free vertical movement therealong and subsequent rotational movement upon vertical acceleration of the float-member in response to an unbalance of axially vertically acting forces in the tube, whereby said float-member will assume its true position without any visible oscillation at said position.

8. A fluid flow meter comprising an upright generally vertically tapered metering tube, a guide-rod having a square cross-section extending axially upwardly through said metering tube, said guide-rod being twisted to form a long-lead helical screw, a float-member comprising a cylindrical body portion, a tapered tail portion and a tapered head portion, said float-member being provided with an axial bore extending therethrough for slidably receiving said guide-rod and being freely movable thereon, a nut provided within the head portion of said float-member and fixedly retained therein, said nut being bored to fit said twisted guide-rod and permit limited free vertical movement therealong and subsequent rotational movement upon vertical acceleration of the float-member in response to an unbalance of axially vertically acting forces in the tube, whereby said float-member will assume its true position without any visible oscillation at said position.

9. For measuring the rate-of-flow of compressible fluids, a vertical metering tube having vertically-varying cross-sectional area available for fluid flow, a guide-rod extending axially along said tube, a metering float mounted on said guide-rod and adapted for vertical movement therealong responsive to variations in rate-of-flow, and means for snubbing said float when its vertical acceleration becomes excessive, said means including a loose-fitting long-lead screw connection between said float and said guide-rod.

10. For measuring the rate-of-flow of compressible fluids, a vertical metering tube having vertically-varying cross-sectional area available for fluid flow, a guide-rod extending axially along said tube, a metering float mounted on said guide-rod and adapted for vertical movement therealong responsive to variations in rate-of-flow, and means for snubbing said float when its vertical acceleration becomes excessive, said means including a screw-threaded connection intermediate said float and said guide-rod, whereby excessive vertical accelerating force upon said float will be partly converted to frictional rotation of said float, thereby to dampen the float against its normal tendency to oscillate above and below its true position.

NATHANIEL BREWER.